(12) United States Patent
Nakazawa et al.

(10) Patent No.: US 9,527,180 B2
(45) Date of Patent: Dec. 27, 2016

(54) MACHINE TOOL

(71) Applicants:CITIZEN HOLDINGS CO., LTD., Tokyo (JP); CITIZEN MACHINERY MIYANO CO., LTD., Nagano (JP)

(72) Inventors: Sakae Nakazawa, Nagano (JP); Akira Handa, Saitama (JP); Shouzen Yanakawa, Saitama (JP)

(73) Assignees: CITIZEN HOLDINGS CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 14/437,832

(22) PCT Filed: Oct. 9, 2013

(86) PCT No.: PCT/JP2013/077494
§ 371 (c)(1),
(2) Date: Apr. 23, 2015

(87) PCT Pub. No.: WO2014/065123
PCT Pub. Date: May 1, 2014

(65) Prior Publication Data
US 2015/0258649 A1    Sep. 17, 2015

(30) Foreign Application Priority Data

Oct. 26, 2012    (JP) .................................. 2012-236503

(51) Int. Cl.
*B23Q 1/52*    (2006.01)
*B23Q 7/04*    (2006.01)
(Continued)

(52) U.S. Cl.
CPC ............ *B23Q 7/04* (2013.01); *B23Q 11/0891* (2013.01); *B23B 7/06* (2013.01); *Y10T 82/2514* (2015.01)

(58) Field of Classification Search
CPC ............ B23Q 1/48; B23Q 1/606; B23Q 7/00; B23Q 7/04; B23B 13/00; B23B 13/04
See application file for complete search history.

(56) References Cited

U.S. PATENT DOCUMENTS 2,919,010 A * 12/1959 Hautau ..................... B23Q 7/04
198/803.7
2,927,703 A *  3/1960 Smith ...................... B23Q 7/04
414/626
(Continued)

FOREIGN PATENT DOCUMENTS

JP    H06-190602 A    7/1994
JP    H07-088701 A    4/1995
(Continued)

OTHER PUBLICATIONS

Written Opinion of the International Searching Authority for PCT/JP2013/077494, Dec. 24, 2013.
(Continued)

*Primary Examiner* — Will Fridie, Jr.

(57) ABSTRACT

A set means for setting a workpiece (11) is provided behind a main shaft (4), the front end of which is provided with a chuck (8) that opens and closes freely, and is disposed so as to support the workpiece (11) with the chuck central axis line (C1) of the chuck (8) and the workpiece central axis line (C2) of the workpiece (11) positioned on a single line. The orientation of a workpiece (11)-holding means (53) of a conveyance means (56) for conveying the workpiece (11) between the set means (41) and the main shaft (4) is configured to be maintained when transferring the workpiece (11) between the holding means and the set means (41) and when transferring between the holding means and the chuck (8).

2 Claims, 10 Drawing Sheets

(51) Int. Cl.
*B23Q 11/08* (2006.01)
*B23B 7/06* (2006.01)

(56) References Cited

U.S. PATENT DOCUMENTS

| | | | | | |
|---|---|---|---|---|---|
| 3,124,257 | A | * | 3/1964 | Price | B23Q 7/00 198/346.2 |
| 4,161,849 | A | * | 7/1979 | Voumard | B23Q 7/04 414/728 |
| 4,317,394 | A | * | 3/1982 | Link | B23Q 7/04 451/335 |
| 4,445,405 | A | * | 5/1984 | Champeau | B23Q 7/04 82/124 |
| 4,512,223 | A | * | 4/1985 | Puhringer | B23B 3/06 82/124 |
| 2008/0181759 | A1 | * | 7/2008 | Gaegauf | B23Q 7/04 414/751.1 |

FOREIGN PATENT DOCUMENTS

| | | | |
|---|---|---|---|
| JP | 2005-059145 A | | 3/2005 |
| JP | 2008-183705 A | | 8/2008 |
| WO | 2008/050912 A1 | | 5/2008 |

OTHER PUBLICATIONS

International Search Report for PCT/JP2013/077494, Dec. 24, 2013.
European Patent Office, Extended European Search Report for EP Patent Application No. 13849057.8, Jul. 5, 2016.
State Intellectual Property Office of the People's Republic of China, Office Action for Chinese patent application No. 201380055837.X, Mar. 24, 2016.

* cited by examiner

MACHINE TOOL

FIELD

The present invention relates to a machine tool.

BACKGROUND

Conventionally, a machine tool that includes a main shaft having a chuck capable of opening and closing on a front end and a conveyance means for conveying a workpiece, which is configured so that the conveyance means has a holding means for holding a workpiece, a chuck central axis line of the chuck and a workpiece central axis line of the workpiece are positioned on a single line in front of the main shaft, and the workpiece is transferred between the chuck (main shaft) and the holding means is publicly known (e.g., see Patent Literature 1).

PATENT LITERATURE

[Patent Literature 1] Domestic re-publication of PCT international application No. WO 2008/050912

SUMMARY OF THE INVENTION

Technical Problem

The above-described machine tool, etc., has been required to have a configuration including a conveyance device capable of simply conveying a workpiece by transferring the workpiece between a set means for setting the workpiece and the main shaft.

Solution to Problem

The machine tool of the present invention for solving the above-described problem includes a main shaft 4 having a chuck 8 capable of opening and closing on a front end side, a set means 41 for setting a workpiece 11, and a conveyance means 56 for conveying the workpiece 11 between the set means 41 and the main shaft 4, the tool machine being configured so that the conveyance means 56 has a holding means 53 for holding the workpiece 11, a chuck central axis line C1 of the chuck 8 and a workpiece central axis line C2 of the workpiece 11 are positioned on a single line in front of the main shaft 4, and the workpiece 11 is transferred between the chuck 8 and the holding means 53, wherein the machine tool has a first feature that the set means 41 is provided behind the main shaft 4 and is disposed so as to support the workpiece 11 by positioning the chuck central axis line C1 and the workpiece central axis line C2 on a single line, and the posture of the holding means 53 when transferring the workpiece 11 with the set means 41 is maintained when transferring said workpiece (11) with said chuck (8).

A second feature is that a slide body 43 that slides and moves between the front side and the rear side of the main shaft 4, an arm 49 that supports the holding means 53, and a turning supporting means 47 for supporting the arm 49 so as to be capable of turning are provided, the turning supporting means 47 is provided in the slide body 43, and the posture of the arm 49 is switched between a lying-on-side posture B when transferring the workpiece 11 and an upright posture when conveying the workpiece 11 between the set means 41 side and the main shaft 4 side.

A third feature is that the main shaft 4 is provided so as to be capable of moving back and forth along the axis line direction, in front of the main shaft 4, a support 12 for supporting a tool 15 for machining a workpiece is provided so as to be capable of moving, in front of the support 12, the tool 15 is disposed, the front portion of the support 12 is used as a machining area A1 of the workpiece 11, the support 12 is provided with an insertion part 14 into which the main shaft 4 is inserted, and the range of movement of the main shaft 4 is delimited from the position where the main shaft 4 is inserted into the insertion part 14 and the workpiece 11 is disposed within the machining area A1 to the position where a space 16 for transferring the workpiece 11 between the holding means 53 and the chuck 8 is formed on the rear side of the support 12.

A fourth feature is that a shutter 17 that blocks the insertion part 14 so as to separate the machining area A1 from the area on the rear side of the support 12 is provided so as to be capable of opening and closing.

Advantageous Effects of Invention

According to the structure of the present invention, which is configured as above, the workpiece is supported by the set means behind the main shaft in the state in which the chuck central axis line and the workpiece central axis line are positioned on a single line, and therefore it is possible to transfer the workpiece between the holding means and the main shaft or between the holding means and the set means while maintaining the posture of the holding means to be the same in front of and behind the main shaft. This results in the effect of being able to easily adjust the posture of the holding means when transferring the workpiece between the holding means and the main shaft or between the holding means and the set means.

For example, by designing a configuration in which a slide body that slides and moves between the front side and the rear side of the main shaft, an arm that supports the holding means, and a turning supporting means for supporting the arm so as to be capable of turning are provided, the turning supporting means is provided in the slide body, and the posture of the arm can be switched between the lying-on-side posture when transforming the workpiece and the upright posture when conveying the workpiece between the set means side and the main shaft side, it is possible to transfer the workpiece between the holding means and the main shaft or between the holding means and the set means with the same lying-on-side posture.

In this case, by adjusting and determining the turning angle of the arm in the lying-on-side posture, it is possible to easily adjust the posture of the holding means when transferring the workpiece between the main shaft and the set means, and it is also possible to reduce the size and weight of the conveyance means by use of one adjusting means.

In the case of, for example, a Swiss automatic lathe in which workpieces to be supplied are fed sequentially into the hollow main shaft from behind the main shaft, it is possible to design the structure of the set means so as to be used in common by a long rod-shaped workpiece having a length of 2.5 m or 4.0 m and a workpiece that is conveyed to the front side of the main shaft by the conveyance means. Further, by designing a configuration in which, for example, a feed guide structure in the case of the long rod-shaped material and the set means in the case of the supply of the workpiece by the conveyance means are switched so that the supply of a workpiece is switched to another, it is also possible to design a configuration in which the supplying means for the supply of the long rod-shaped material workpiece and the supply of the semi-finished material workpiece are disposed in the same area.

In the case of a machine tool having a configuration in which the main shaft is provided so as to be capable of moving back and forth along the axis line direction, in front of the main shaft, the support that supports the tool for machining a workpiece so as to be capable of moving, in front of the support, the tool is disposed, the area in front of the support is set as a machining area of a workpiece, and the support is provided with an insertion part into which the main shaft is inserted, by delimiting the range of movement of the main shaft from the position where the main shaft is inserted into the insertion part and the workpiece is disposed within the machining area to the position where a space for transferring a workpiece between the holding means and the chuck is formed on the rear side of the support, it is possible to easily transfer a workpiece between the holding means and the chuck on the rear side of the support.

In particular, by providing a shutter, which blocks the insertion part, so as to be capable of opening and closing so that the machining area and the area on the rear side of the support are separated, it is possible to prevent cutting oil and cuttings that scatter in the machining area from entering the area on the rear side of the support and it is possible to transfer a workpiece between the holding means and the main shaft or between the holding means and the set means in a comparatively clean environment.

DESCRIPTION OF EMBODIMENTS

Figure 1:
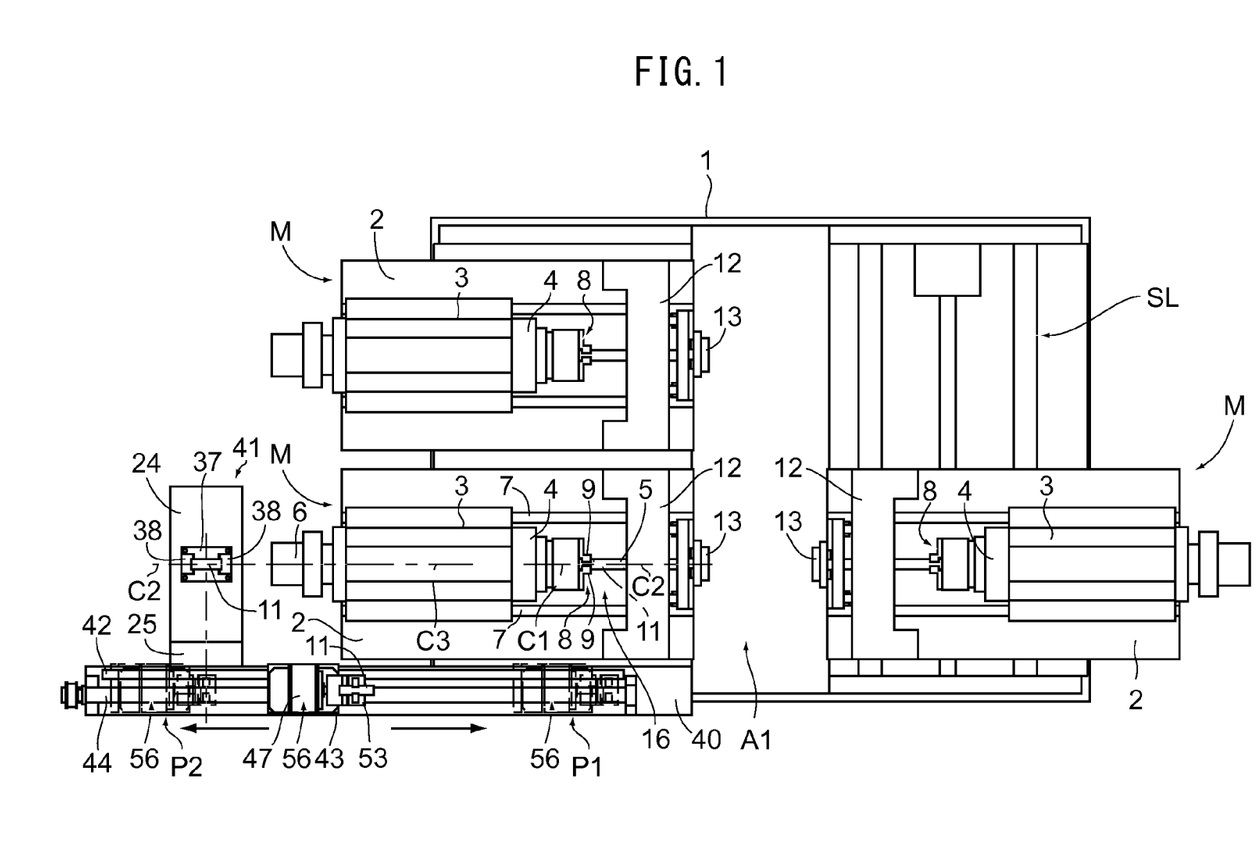
FIG. 1 is a plan view of a machine tool according to the present invention.

In the following, with reference to the drawings, a machine tool is explained. However, it should be understood that the present invention is not limited to the drawings or embodiments explained below. FIG. 1 illustrates an automatic lathe, which is an example of the machine tool according to the present invention. The automatic lathe is configured by including a bed 1, on which three lathe modules M being mounted. The two lathe modules M are provided side by side and the one lathe module M is provided so as to oppose the two lathe modules M provided side by side and to be capable of sliding via a slide mechanism SL.

Each lathe module M has the same structure and is configured on a base 2 fixed to the bed 1. A main shaft table 3 is provided on the base 2 of each lathe module M. The main shaft table 3 supports a main shaft 4 so as to be capable of rotating. The main shaft 4 is rotationally driven by a main shaft motor 6 provided behind the main shaft table 3.

A slide rail 7 is provided on the base 2 in the axis line direction (Z-axis direction) of the main shaft 4. The two slide rails 7 are provided in parallel to each other. The main shaft table 3 is mounted on both the slide rails 7. The main shaft table 3 is screwed into and coupled with a ball screw 5 provided between both the slide rails 7 and when the ball screw 5 is rotationally driven, the main shaft table 3 moves along the slide rail 7.

Figure 2A:
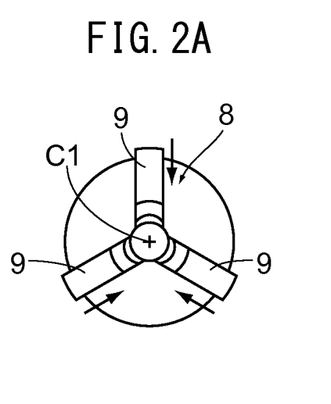
FIG. 2A illustrates an open state.
Figure 2B:
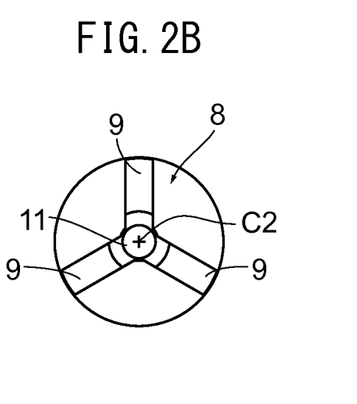
FIG. 2B illustrates a grasp state of a workpiece.

A main shaft chuck 8 is provided on the front end of the main shaft 4, so as to be capable of opening and closing. The main shaft chuck 8 includes a plurality of chuck claws 9. As illustrated in FIGS. 2A and 2B, each chuck claw 9 is disposed at equal intervals around a chuck central axis line C1 of the main shaft chuck 8. Each chuck claw 9 closes when moving toward the chuck central axis line C1.

the workpiece 11 is grasped by the main shaft chuck 8, by inserting a workpiece 11 between the chuck claws 9 in the open state illustrated in FIG. 2A and by closing the chuck claws 9 as illustrated in FIG. 2B. The main shaft chuck 8 grasps the workpiece 11 so that the chuck central axis line C1 and a central axis line (workpiece central axis line) C2 of the workpiece 11 are positioned on a single line. The main shaft chuck 8 is attached in such a manner that the chuck central axis line C1 and an axis line C3 of the main shaft 4 are positioned on a single line (see FIG. 1).

Figure 3:
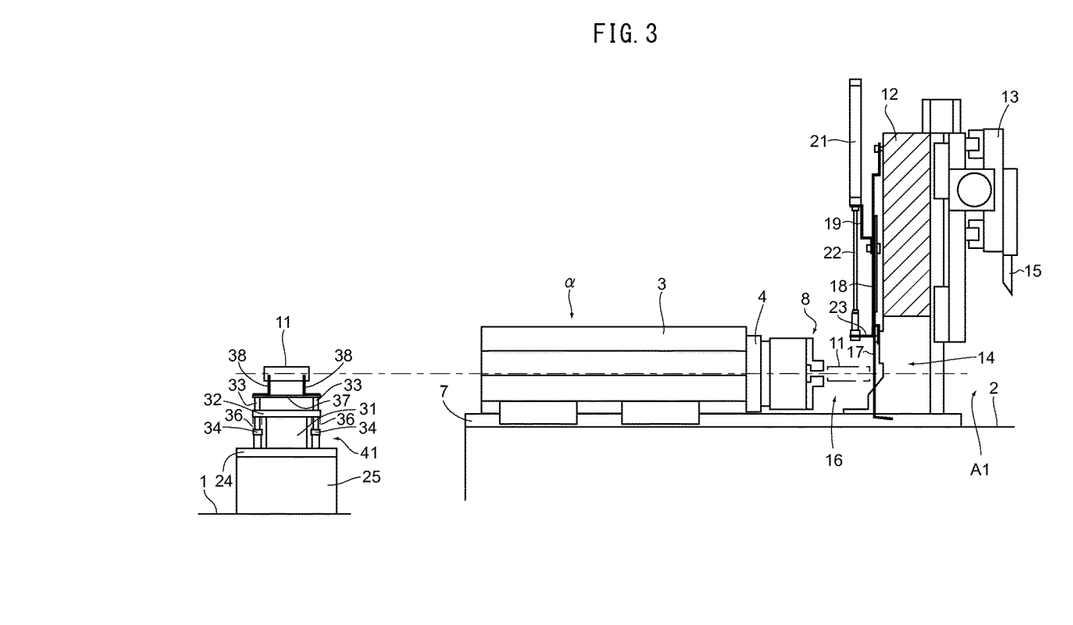
FIG. 3 is a front sectional view of essential parts of a supporting table portion.

In front of the main shaft table 3, a supporting table 12 is provided. The supporting table 12 is fixed to the base 2. As illustrated in FIG. 3, in front of the supporting table 12, a blade table 13 is provided so as to be capable of moving in two directions (X-axis direction and Y-axis direction) perpendicular to the Z-axis direction. The X-axis direction and the Y-axis direction are perpendicular to each other. A tool 15 is attached to the blade table 13.

Figure 4:
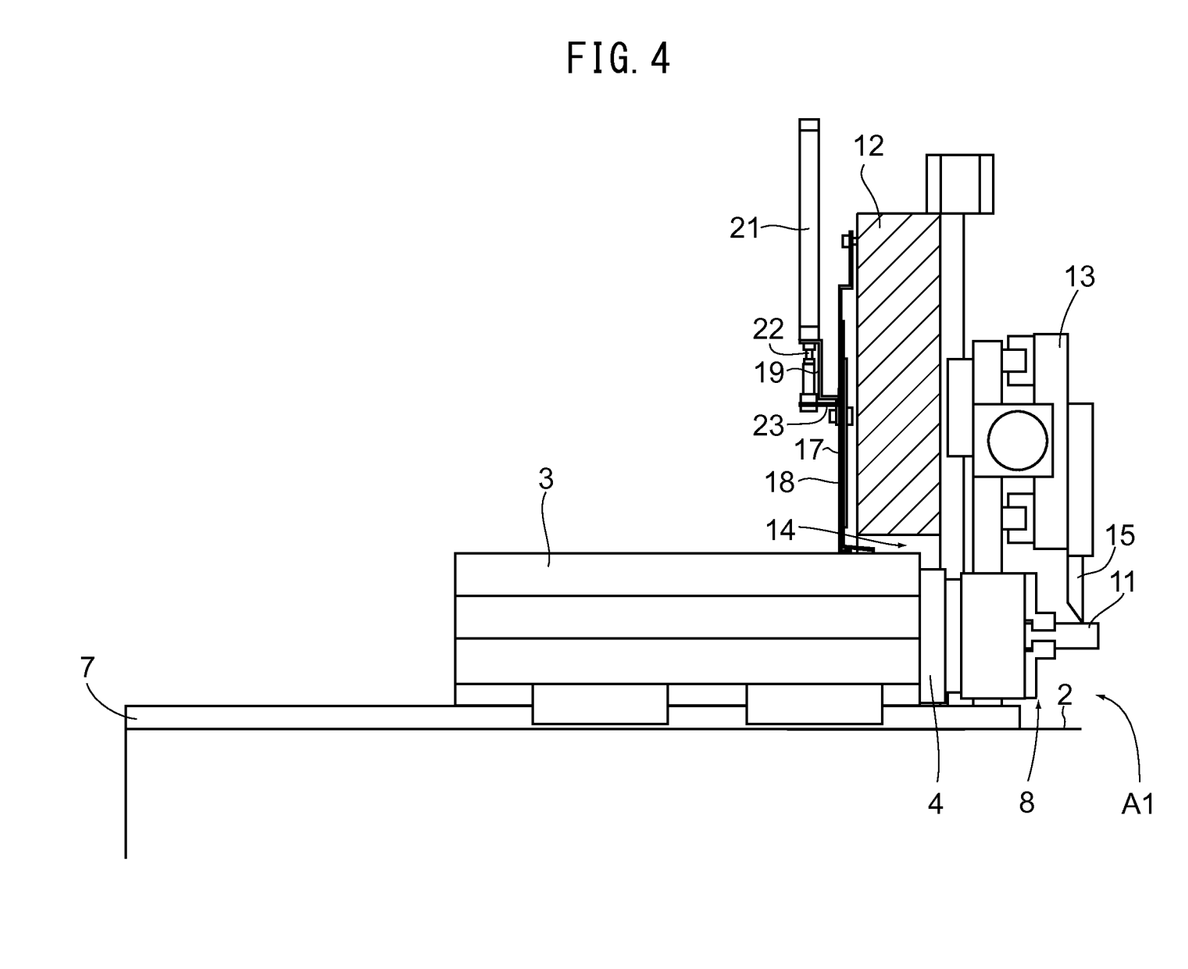
FIG. 4 is a front sectional view of essential parts of the supporting table portion in a workpiece machining state.
Figure 5A:
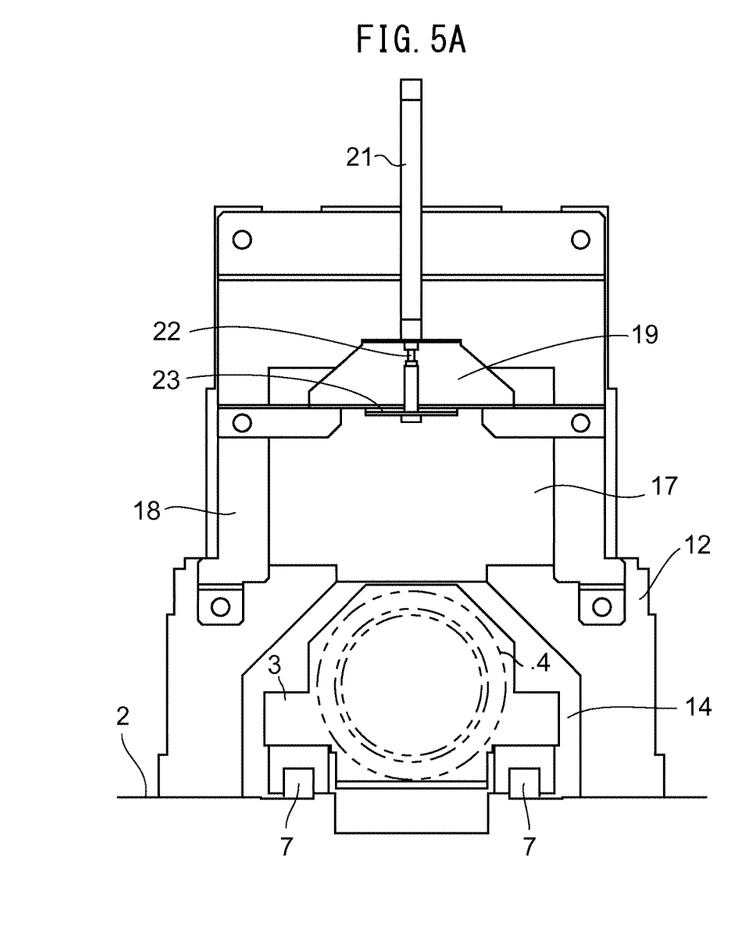
FIG. 5A illustrates an open state of a shutter.
Figure 5B:
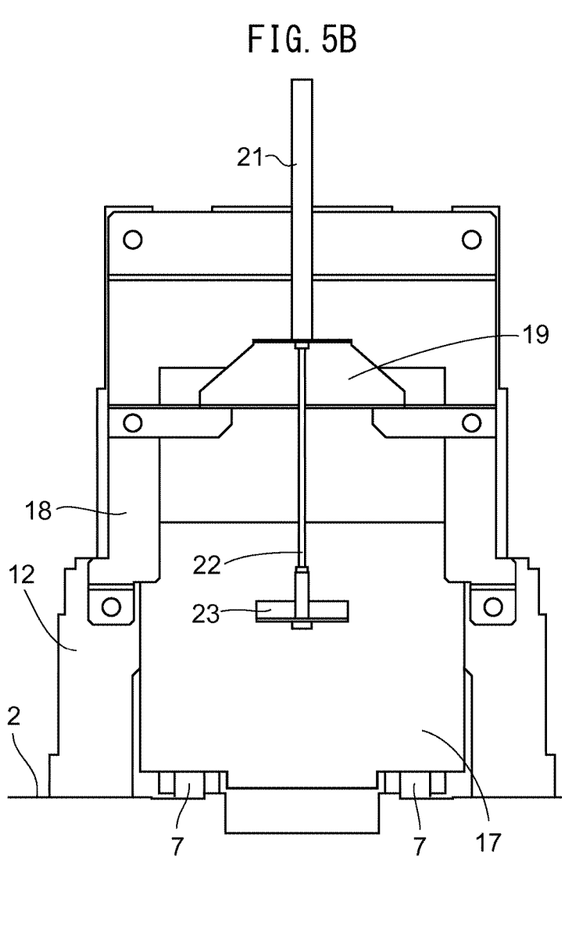
FIG. 5B illustrates a closed state of the shutter.

As illustrated in FIGS. 3 to 5, the supporting table 12 is formed into the shape of a gate so as to allow the main shaft table 3 to pass through. As illustrated in FIG. 4, for the main shaft table 3, the range of forward movement in the Z-axis direction is set so as to be capable of positioning the workpiece 11 grasped by the main shaft 4 in front of the supporting table 12 through a space 14 of the gate.

At this time, the main shaft 4 is inserted into the space 14 as an insertion part in the state where the main shaft 4 is supported by the main shaft table 3. As illustrated in FIG. 3, for the main shaft table 3, the range of backward movement in the Z-axis direction is set so as to be capable of moving to a retracted position α so that a predetermined space 16 is formed between the front end of the main shaft 4 and the supporting table 12 behind the supporting table 12.

The front of the supporting table 12 constitutes a machining area A1 where the workpiece 11 is machined. As illustrated in FIG. 4, when the workpiece 11 grasped by the main shaft 4 is caused to protrude forward in front of the supporting table 12, it is possible for each lathe module M to machine the workpiece 11 with the tool 15 in the machining area A1 independently of one another by the movement of the main shaft table 3 in the Z-axis direction and the movement of the blade table 13 in the X-axis direction and in the Y-axis direction.

The space 16 appears and disappears in accordance with the movement of the main shaft table 3. As illustrated in FIG. 4, when the workpiece 11 is machined, the space 16 is occupied by the main shaft table 3, and therefore the space 16 does not appear. As illustrated in FIG. 3, when the main shaft table 3 is moved to the retracted position, the space 16 appears.

A plate-shaped shutter 17 for blocking the space (insertion part) 14 is provided on the rear end side of the supporting table 12. The shutter 17 is held by a guide cover 18 fixed to the supporting table 12 so as to be capable of moving up and down in the vertical direction. A cylinder 21 is attached to the guide cover 18, via a cylinder attaching plate 19. The cylinder 21 is attached so that a cylinder rod 22 moves in the vertical direction.

The cylinder rod 22 is linked to the shutter 17 via a bracket 23. The shutter 17 is driven so as to move up and down by the cylinder 21. The shutter 17 moves up by the contracting motion of the cylinder rod 22 and moves down by the extending motion of the cylinder rod 22. As illustrated in FIG. 5B, by the shutter 17 moving down, the space 14 is blocked. As illustrated in FIG. 5A, by the shutter 17 moving up, the space 14 is released.

As illustrated in FIG. 4, when the workpiece 11 is machined, the main shaft table 3 is situated within the space 14, and therefore the shutter 17 is kept in the open state. The configuration is such that when the main shaft table 3 moves to the retracted position α, if a structure on the side of the main shaft table 3 moves behind the shutter 17, the shutter 17 closes as illustrated in FIG. 3. The machining area A1 is the environment where cuttings and cutting oil scatter, and therefore by the shutter closing, the area behind the supporting table 12 is a comparatively clean environment separated from the environment of the machining area A1.

Figure 6:
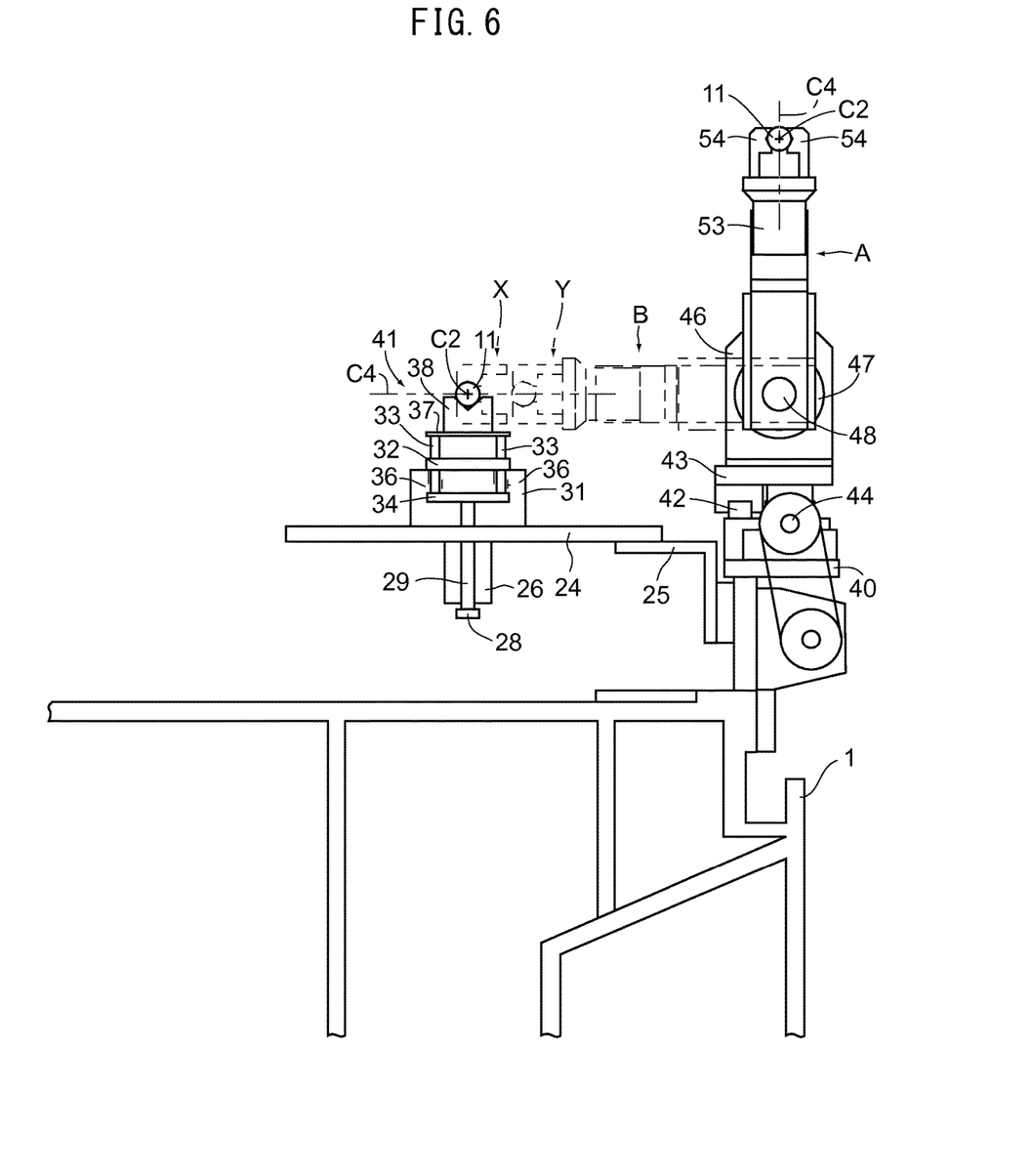
FIG. 6 is a side view of essential parts of a machine tool according to the present invention.
Figure 7A:
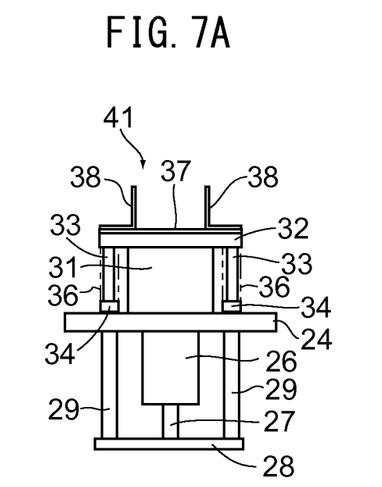
FIG. 7A is a front view of a set means.

Behind the main shaft table 3 situated in the retracted position α, a base plate 24 is provided. As illustrated in FIG. 6, the base plate 24 is fixed on the side of the bed 1 via a bracket 25. As illustrated in FIG. 7, on the undersurface of the base plate 24, a cylinder 26 is fixed. The cylinder 26 is attached so that a cylinder rod 27 faces downward.

A plate 28 is fixed to the cylinder rod 27. A push rod 29 is installed on the plate 28 upright in front and in rear, respectively. Each push rode 29 is inserted into the base plate 24 so as to be capable of protruding upward. The tip of each push rod 29 protrudes above the base plate 24 by the contracting motion of the cylinder rod 27. The tip of each push rod 29 disappears under the base plate 24 by the extending motion of the cylinder rod 27.

Above the base plate 24, a stopper plate 32 is fixed at a position at a predetermined height via a fixing member 31. Into the stopper plate 32, four rods 33 are inserted so as to be capable of sliding and moving in the vertical direction at right and left, and in front and in rear. The lower ends of the left and right rods 33 are linked by a linking plate 34. Around each rod 33, a compression spring 36 is fitted at the outside of the rod 33 between the undersurface of the stopper plate 32 and the top surface of the linking plate 34.

Figure 7B:
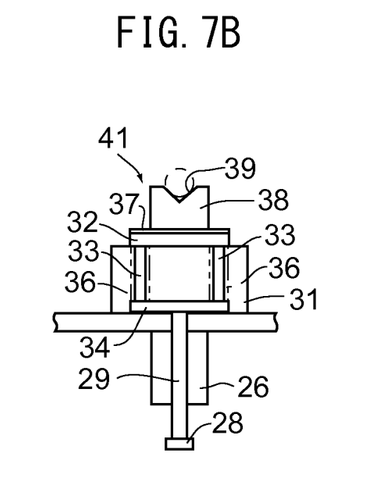
FIG. 7B is a side view of the set means.
Figure 7C:
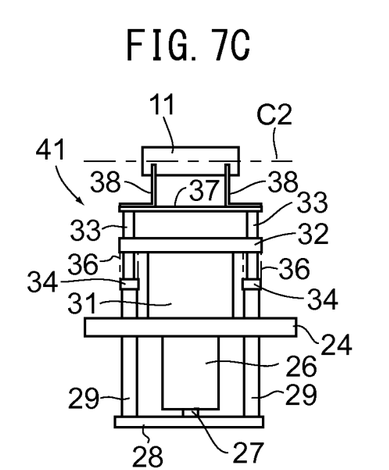
FIG. 7C is a front view of the set means in a state where a workpiece is supported.

A moving up/down plate 37 is fixed to the tip of each rod 33. As illustrated in FIGS. 7A and 7B, the moving up/down plate 37 is biased by the compression spring 36 so as to come into contact with the stopper plate 32. Two workpiece supporting plates 38 are provided on the top surface of the moving up/down plate 37, in opposition to each other in the longitudinal direction. A V-shaped groove 39 in the shape of V when viewed from the side is formed on the workpiece supporting plate 38. As illustrated in FIG. 6 and FIG. 7C, the workpiece 11 is accommodated in the V-shaped groove 39 of both the workpiece supporting plates 38 and supported in the positions in front and in rear.

The tip of each push rod 29 in front and in rear comes into contact with substantially the center of the undersurface of each linking plate 34 in front and in rear. The moving up/down plate 37 moves up by pressing each linking plate 34 upward by each push rod 29 resisting the bias force of the compression spring 36 by causing the cylinder rod 27 to perform the contracting motion. The moving up/down plate 37 moves down by the bias force of the compression spring 36, by causing the cylinder rod 27 to perform the extending motion.

In the state where the workpiece supporting plate 38 has moved down by the moving-down of the moving up/down plate 37, it is possible to supply the workpiece 11 to the workpiece supporting plate 38 and both of the workpiece supporting plates 38 can support the workpiece 11. It is possible to raise the workpiece 11 supported by both the workpiece supporting plates 38, by raising of the moving up/down plate 37 so as to move the workpiece supporting plate 38 up. Both the workpiece supporting plates 38 are set in advance so that the workpiece central axis line C2 and the chuck central axis line C1 are positioned on a single line when both the workpiece supporting plate 38 raise the workpiece 11 (see FIG. 1 and FIG. 3).

A set means 41 for setting the workpiece 11 is configured by the base plate 24, the cylinder 26, the plate 28, the push rod 29, the stopper plate 32, the rod 33, the compression spring 36, the linking plate 34, the moving up/down plate 37, the workpiece supporting plate 38, etc. The set means 41 raises the workpiece 11 by both the workpiece supporting plates 38 and supports the workpiece 11 so that the chuck central axis line C1 and the workpiece central axis line C2 are positioned on a single line.

As illustrated in FIG. 6, a table 40 is fixed integrally to the side of the bed 1. A guide rail 42 in parallel to the Z-axis direction is fixed on the table 40. The guide rail 42 is provided in parallel to the main shaft table 3. A base table 43 is mounted on the guide rail 42.

A ball screw 44 is provided on the table 40. The ball screw 44 is provided in parallel to the guide rail 42. The base table 43 is screwed into and coupled with the ball screw 44 and slides and moves as a slide body along the guide rail 42 by the rotational drive of the ball screw 44. As illustrated in FIG. 1, the base table 43 is set so as to be capable of moving between a position P1 adjacent to the space 16 and a position P2 adjacent to the set means 41.

Figure 8A:
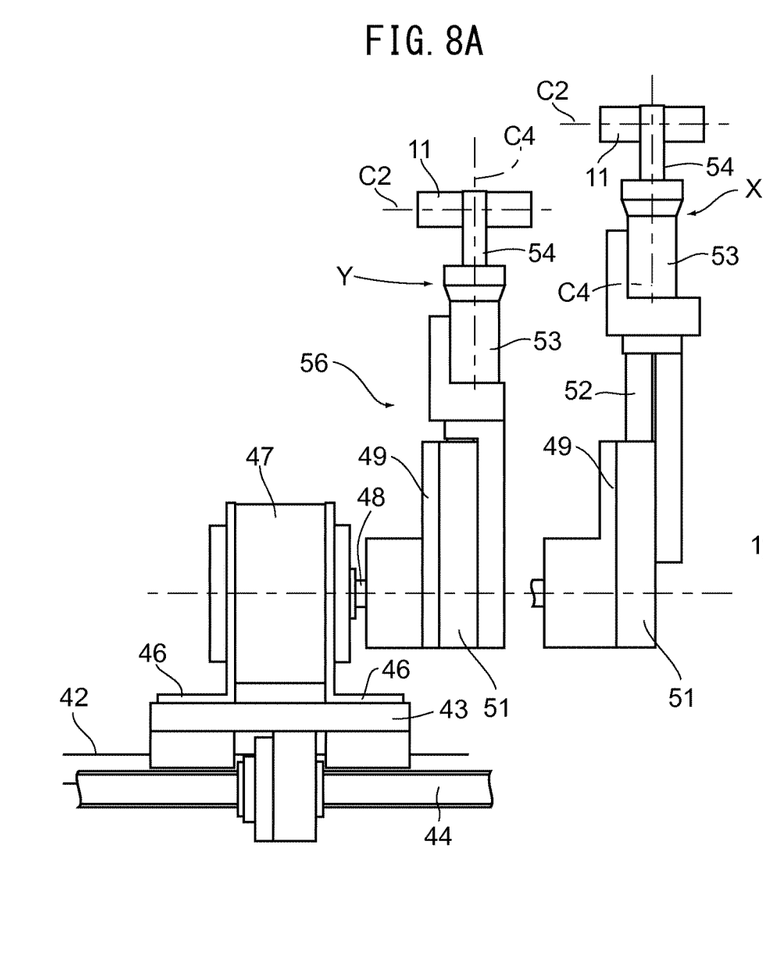
FIG. 8A is a front view of a conveyance means.
Figure 8B:
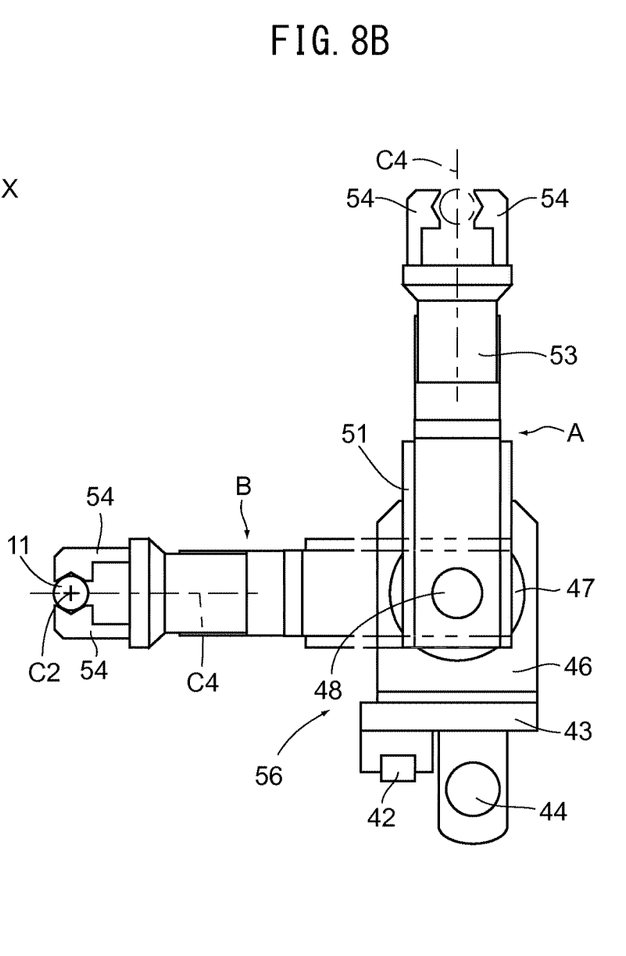
FIG. 8B is a side view of the conveyance means.

As illustrated in FIG. 8, on the base table 43, a rotary actuator 47 is fixed via a bracket 46. An arm 49 is fixed to a rotation drive shaft 48 of the rotary actuator 47 integrally. The rotary actuator 47 supports the arm 49 so as to be capable of turning as a turning supporting means.

As illustrated in FIG. 8B, the arm 49 is switched between an upright posture A in which the arm 49 protrudes upward substantially vertically and a lying-on-side posture B in which the arm 49 faces the side of the main shaft table 3 substantially in the horizontal direction by the rotary actuator 47. The arm 49 is provided with a cylinder 51. A conveyance chuck 53 is attached to a cylinder rod 52 of the cylinder 51.

The conveyance chuck 53 moves back and forth in the lengthwise direction of the arm 49 by the movement of the cylinder rod 52. The conveyance chuck 53 is switched between a protruded position X where the conveyance chuck 53 protrudes from the arm 49 and an initial position Y where the conveyance chuck 53 is situated on the side of the arm 49. At the tip of the conveyance chuck 53, chuck claws 54 capable of opening and closing are provided in opposition to each other. Both of the chuck claws 54 are disposed symmetrically with respect to a chuck central axis line C4 of the conveyance chuck 53.

Each chuck claw 54 closes by moving toward the chuck central axis line C4 of the conveyance chuck 53. It is possible for the conveyance chuck 53 to grasp the workpiece 11 by inserting the workpiece 11 between both the chuck claws 54 in the state where the chuck claws 54 are open and by closing the chuck claws 54 in the state where the workpiece 11 is inserted. The conveyance chuck 53 configures the holding means for grasping and holding the workpiece 11.

As illustrated in FIG. 6, the turning position of the arm 49 is set so that the height position of the workpiece central axis line C2 of the workpiece 11 that is raised and supported by both the workpiece supporting plates 38 and the height position of the chuck central axis line C4 of the conveyance chuck 53 agree with each other when the arm 49 is in the lying-on-side posture B. As a result, the height position of the chuck central axis line C1 of the main shaft chuck 8, that of the workpiece central axis line C2, and that of the chuck central axis line C4 of the conveyance chuck 53 agree with one another.

Figure 9:
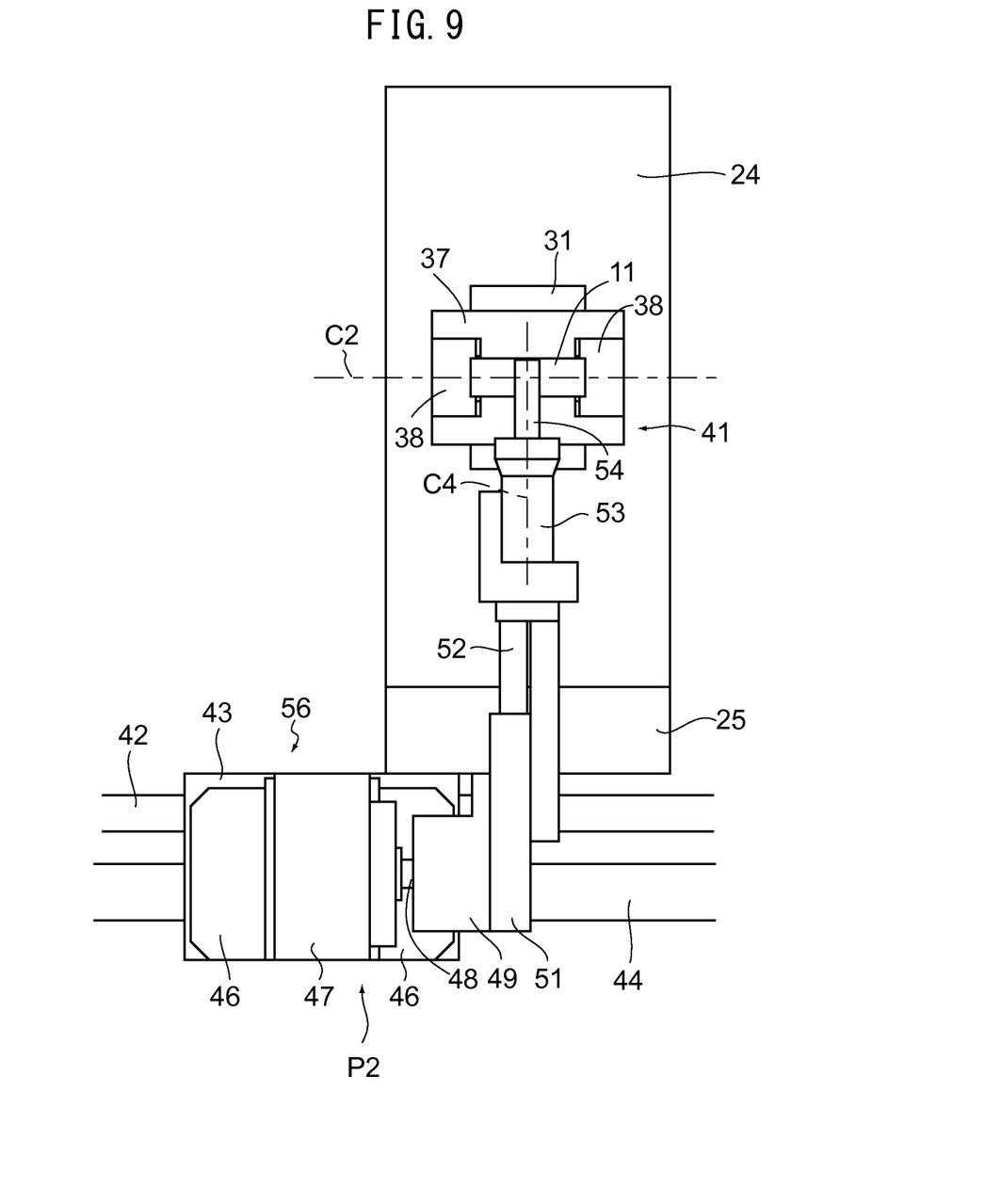
FIG. 9 is a plan view of essential parts illustrating a state where a workpiece is transferred between the conveyance means and the set means.

As illustrated in FIG. 9, it is possible to insert the workpiece 11 that is raised and supported by both the workpiece supporting plates 38 by moving the base table 43 to the position P2, bringing the arm 49 into the lying-on-side posture B, and moving the conveyance chuck 53 so as to protrude into the protruded position X.

It is possible for the conveyance chuck 53 to grasp the workpiece 11 while maintaining the state where the workpiece central axis line C2 and the chuck central axis line C1 of the main shaft chuck 8 are positioned on a single line, by closing the chuck claws 54 in this state. It is possible to convey the workpiece 11 along the axis line direction C3 of the main shaft 4 in the lateral position of the main shaft table 3 by bringing the arm 49 into the upright posture A and moving the base table 43 in the state where the workpiece 11 is grasped.

Figure 10:
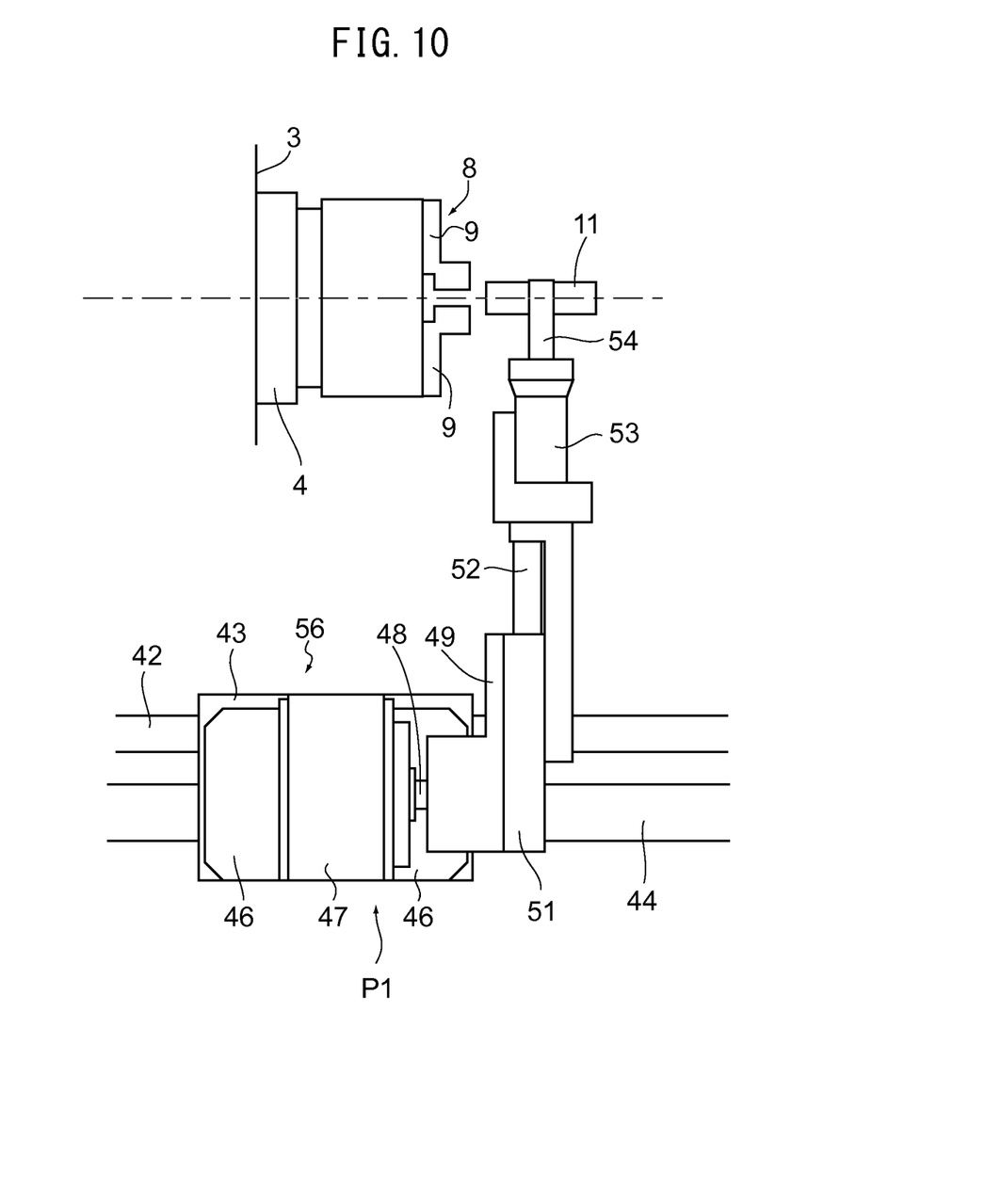
FIG. 10 is a plan view of essential parts illustrating a state where a workpiece is transferred between the main shaft and the set means.

The cylinder 51 is set so as to return the conveyance chuck 53 to the initial position Y when the arm 49 is brought into the upright posture A. As illustrated in FIG. 10, it is possible to dispose the workpiece 11 in front of the main shaft 4 in the state where the workpiece 11 is grasped by the conveyance chuck 53 within the space 16 by moving the main shaft table 3 to the retracted position α, causing the base table 43 to be situated in the position P1, bringing the arm 49 into the lying-on-side posture B, and moving the conveyance chuck 53 to the protruded position X.

A conveyance device 56 of the workpiece 11 is configured by the guide rail 42, the ball screw 44, the base table 43, the rotary actuator 47, the arm 49, the conveyance chuck 53, the cylinder 51, etc. The transfer of the workpiece 11 between the conveyance chuck 53 and the set means 41 is performed in the state where the chuck central axis line C1 of the main shaft chuck 8 and the workpiece central axis line C2 are positioned on a single line by bringing the arm 49 into the lying-on-side posture B and by causing the conveyance chuck 53 to be situated in the protruded position X.

As a result, if the arm 49 is brought into the lying-on-side posture B in the position in front of the main shaft 4 and the conveyance chuck 53 is caused to be situated in the protruded position X, the workpiece 11 is disposed in the position in front of the main shaft 4 in the state where the chuck central axis line C1 of the main shaft chuck 8 and the workpiece central axis line C2 are positioned on a single line. As a result, the transfer of the workpiece 11 between the main shaft chuck 8 and the conveyance chuck 53 is enabled.

In the present embodiment, the conveyance device 56 is used as a loader for supplying a workpiece to the main shaft 4. Loading of the workpiece 11 to the main shaft 4 is performed by moving down the workpiece supporting plate 38 first, and by causing the workpiece supporting plate 38 to hold the workpiece 11 supplied to the set means 41. Next, the workpiece supporting plate 38 is caused to move up to support the workpiece 11 and the workpiece 11 is grasped by the conveyance chuck 53.

Next, in the state where the space 16 is formed between the front end of the main shaft 4 and the supporting table 12 due to the movement of the main shaft table 3 to the retracted position α, the workpiece 11 is conveyed to the position in front of the main shaft 4. Next, by moving the main shaft table 3 or the base table 43 in the Z-axis direction in the state where the main shaft chuck 8 is open, the workpiece 11 is inserted between the chuck claws 9 of the main shaft chuck 8.

Next, by closing the main shaft chuck 8 (chuck claws 9) and opening the conveyance chuck 53, the main shaft 4 is caused to grasp the workpiece 11 within the space 16, and thereby, the loading of the workpiece 11 to the main shaft 4 is completed. It is possible to start the next loading work, by returning the conveyance chuck 53 to the initial position Y, Switching the arm 49 to the upright posture A, and moving the base table 43 to the position behind the main shaft table 3. It is also possible to supply the workpiece 11 to the workpiece holding plate 38 by using the conventional parts feeder, etc. Since the conventional parts feeder is well known, a detailed explanation thereof is omitted.

Since the chuck central axis line C1 of the main shaft chuck 8 and the workpiece central axis line C2 raised and supported by the workpiece supporting plate 38 are positioned on a single line, it is possible to make the same the posture of the conveyance chuck 53 when transferring the workpiece 11 with the set means 41 and when transferring the workpiece 11 with the main shaft chuck 8.

Due to this, it is possible to easily adjust and set the posture of the conveyance chuck 53 when transferring the workpiece 11 between the conveyance chuck 53 and the main shaft chuck 8 or between the conveyance chuck 53 and the set means 41. In the case of the present embodiment, the conveyance chuck 53 is provided to the arm 49 that is supported in a turnable manner, and therefore it is possible that the position of turning of the arm 49 when grasping the workpiece 11 from the set means 41 is the same as the position of turning of the arm 49 when supplying the workpiece 11 to the main shaft chuck 8.

As a result, it is possible to reduce the numbers of postures when causing the arm 49 to lie on its side to one, i.e., the lying-on-side position B, to simply configure the mechanism, etc., to determine the position of turning of the arm 49 by the adjustment, etc., of the angle of turning of the rotary actuator 47, and to easily perform the position adjustment of the posture since there is only one posture. For example, in the case where the posture of the arm 49 is determined to be the lying-on-side posture B by causing the arm 49 to come into contact with the stopper, only one stopper is necessary, and therefore the structure of the mechanism to determine the position is simplified.

The loading of the workpiece 11 is performed in a comparatively clean environment behind the supporting table 12 in the state where the shutter 17 is closed. As a result, it is possible to prevent defective loading, etc., due to cutting oil, cuttings, etc., and therefore stable loading can be performed.

The set means 41 of the present embodiment is configured to position the workpiece central axis line C2 and the central axis line C1 of the main shaft chuck on a single line by raising and supporting the workpiece 11. As a result, in the case where the diameter or the workpiece 11 is changed, it is possible to raise and support the workpiece 11 so as to easily position the workpiece central axis line C2 and the central axis line C1 of the main shaft chuck on a single line only by adjusting the stroke of the cylinder 26 (cylinder rod 27). As a result, it is possible to easily change the diameter of the workpiece 11.

In the case where the tool machine according to the present invention is the Swiss automatic lathe, it is also possible that the set means 41 is used in common by a long rod-shaped material workpiece having a length of 2.5 m or 4.0 m, etc., that is sequentially fed from behind the hollow main shaft and a short or step-shaped workpiece that is preferably conveyed to the side in front of the main shaft 4 by the conveyance means 56 explained in the present embodiment.

Alternatively, it is also possible to design a configuration in which, for example, a feed guide structure in the case of the long rod-shaped material workpiece and the set means 41 in the case of the supply of the workpiece by the conveyance means are switched. In this case, the workpiece central axis line C2 and the chuck central axis line C1 of the main shaft chuck 8 are positioned on a single line, and therefore it is possible to adopt a structure in which the supply of the long rod-shaped material workpiece and the supply of the semi-finished material workpiece are performed in the same area.

Further, it is also possible to design a configuration in which the arm 49 is fixed in advance in the lying-on-side state without turning the arm 49 and the conveyance chuck 53 is moved back and forth toward and away from the side of the main shaft table 3 by the rodless cylinder 51, etc. In this case, it is possible to make common the protruded position of the conveyance chuck 53 when grasping the workpiece 11 from the workpiece supporting plate 38 and when supplying the workpiece 11 to the main shaft chuck 8.

Due to this, it is possible not only to easily configure the mechanism to determine the protruded position of the conveyance chuck 53, but also to easily adjust the position of the posture. It may also be possible to design a configuration in which the arm 49 is not provided and the conveyance chuck 53 is simply provided so as to be capable of moving back and forth toward and away from the side of the main shaft table 3.

It is also possible to configure the conveyance device so as to insert the workpiece 11 between the chuck claws 54 by moving down the conveyance chuck 53 from above. In this case, it is possible that the position to which the conveyance chuck 53 is moved down when grasping the workpiece 11 from the workpiece supporting plate 38 is in common with the position when supplying the workpiece 11 to the main shaft chuck 8. Due to this, it is possible not only to easily configure the mechanism to determine the position to which the conveyance chuck 53 is moved down but also to easily adjust the posture.

In the above-described embodiment, the example is explained in which the conveyance device 56 is used as a loader to supply the workpiece 11 set to the set means 41 to the main shaft 4, but it is also possible to use the conveyance device 56 as an unloader that grasps the machined workpiece grasped by the main shaft chuck 8 with the conveyance chuck 53 and conveys the workpiece to the set means 41. In the case where the conveyance device 56 is used as an unloader, it is sufficient to perform the operation of the loader in the opposite order, and therefore a detailed explanation of the operation is omitted.

It is possible to make the workpiece supporting plate 38 to support the workpiece 11 grasped by the main shaft chuck 53 by positioning the chuck central axis line C1 of the main shaft chuck 8 and the workpiece central axis line C2 on a single line, by using the conveyance device 56 as an unloader. In addition to the use of the one conveyance device 56 as both a loader and an unloader, it is also possible to dispose the conveyance devices 56 having the same structure along the main shaft table 4 of the predetermined lathe module M and to use one as a loader and the other as an unloader.

The shutter 17 may be provided on the front end side of the supporting table 12. In this case, it is possible to prevent cutting oil and cuttings from entering the space 14. It may also be possible to provide a wiper on the circumferential surface forming the space 14 of the supporting table 12 in such a manner that the wiper comes into contact with the main shaft table 3 or the main shaft 4. When the main shaft table 3 moves back, the circumferential surface of the main shaft table 3 or the main shaft 4 is wiped, and therefore the cutting oil and cuttings that have stuck to the main shaft table 3 or the main shaft 4 can be removed and cleaned. Due to this, cutting oil, cuttings, etc., that remain on the main shaft table 3 or the main shaft 4 is prevented and it is possible to stably transfer the workpiece 11 with the conveyance chuck 53.

REFERENCE SIGNS LIST 4 main shaft
8 chuck
11 workpiece
12 support
14 space (insertion part)
15 tool
16 space
17 shutter
41 set means
43 base table (slide body)
47 rotary actuator (turning supporting means)
49 arm
53 conveyance chuck (holding means)
56 conveyance means
A upright posture
B lying-on-side posture
A1 machining area
C1 chuck central axis line
C2 workpiece central axis line

What is claimed is:
1. A machine tool comprising:
a main shaft (4) including a chuck (8) capable of opening and closing on a front end; and
a conveyance means (56) for conveying the workpiece (11) with said main shaft (4), wherein
the machine tool is configured so that the conveyance means (56) includes a holding means (53) for holding the workpiece (11) and the workpiece (11) is transferred between said chuck (8) and said holding means (53) by positioning a chuck central axis line (C1) of said chuck (8) and a workpiece central axis line (C2) of said workpiece (11) on a single line in front of said main shaft (4), said main shaft (4) is provided along an axis line direction so as to be capable of moving back and forth, a support (12) that supports a tool (15) for machining a workpiece so as to be capable of moving is provided in front of said main shaft (4), said tool (15) is disposed in front of the support (12), an area in front of said support (12) is set as a machining area (A1) of the workpiece (11), said support (12) is provided with an insertion part (14) into which said main shaft (4) is inserted, and a range of movement of said main shaft (4) is delimited from a position where said main shaft (4) is inserted into said insertion part (14) and said workpiece (11) is disposed within said machining area (A1) to a position where a space (16) for transferring the workpiece (11) between said holding means (53) and said chuck (8) is formed behind said support (12).

2. The machine tool according to claim 1, wherein a shutter (17) for blocking said insertion part (4) is provided so as to be capable of opening and closing in order to separate said machining area (A1) and the rear side of said support (12).

\* \* \* \* \*